No. 725,020. PATENTED APR. 14, 1903.
R. C. AUGUR & H. F. BICKEL.
ENGINEER'S BRAKE VALVE.
APPLICATION FILED MAR. 31, 1902. RENEWED JAN. 5, 1903.
NO MODEL. 3 SHEETS—SHEET 1.
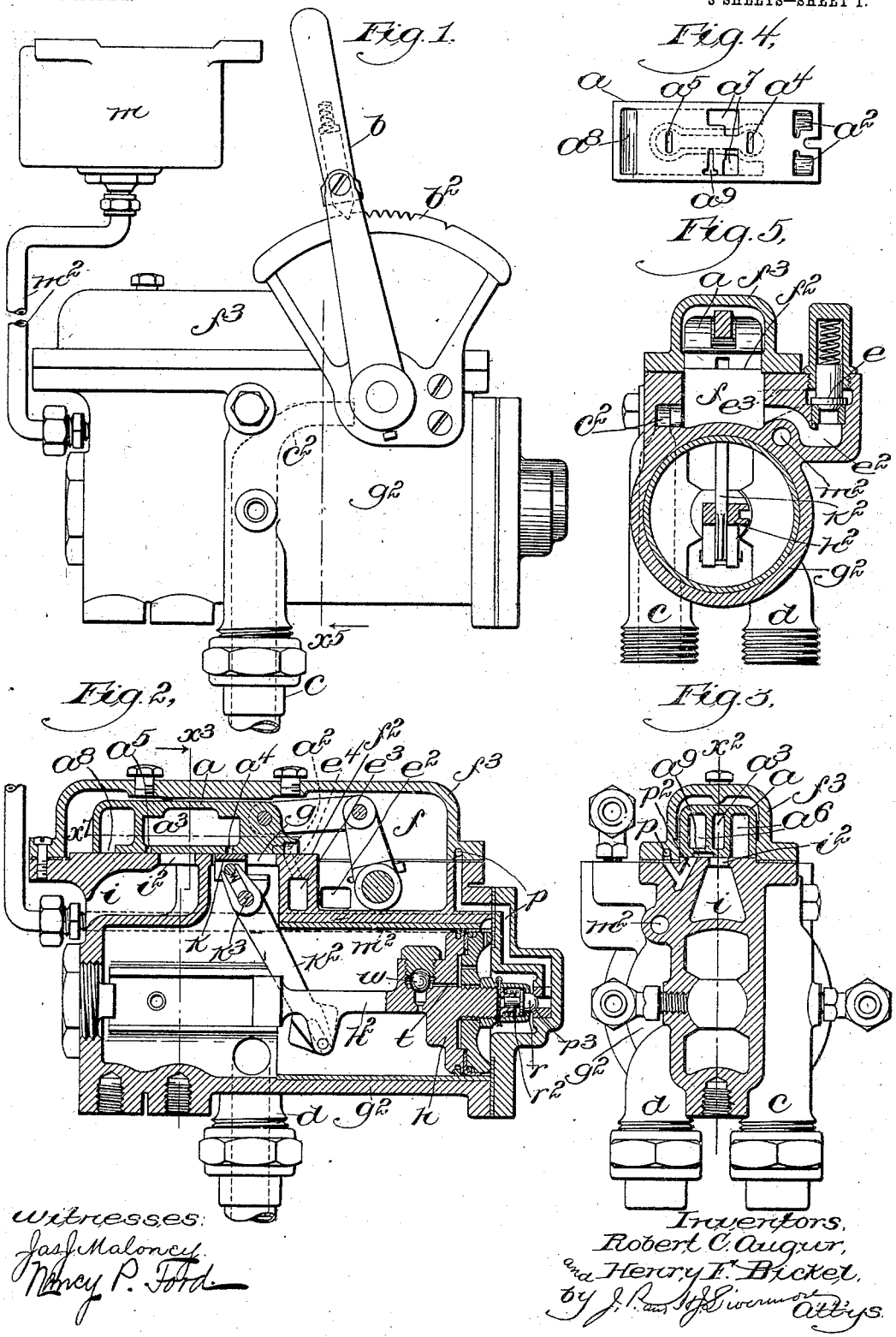
Witnesses:
Jas. J. Maloney
Nancy P. Ford
Inventors,
Robert C. Augur,
and Henry F. Bickel.
by their Attys.

No. 725,020. PATENTED APR. 14, 1903.
R. C. AUGUR & H. F. BICKEL.
ENGINEER'S BRAKE VALVE.
APPLICATION FILED MAR. 31, 1902. RENEWED JAN. 5, 1903.
NO MODEL. 3 SHEETS—SHEET 2.
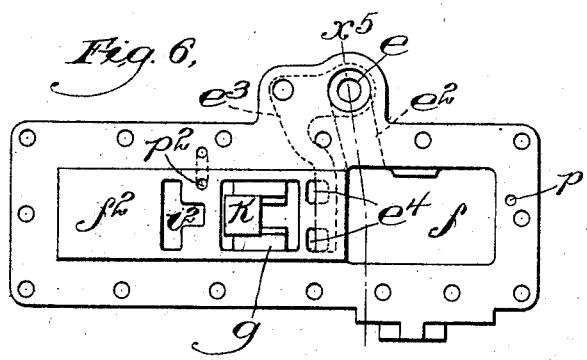
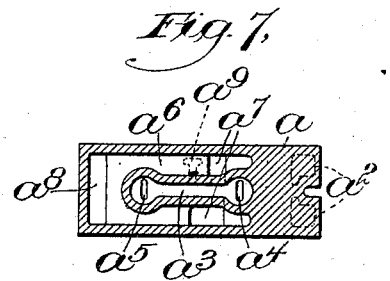
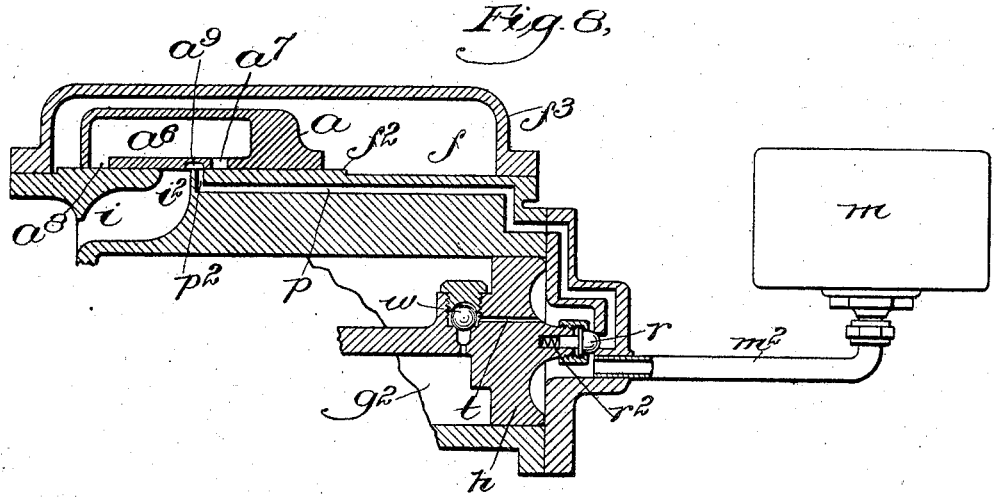
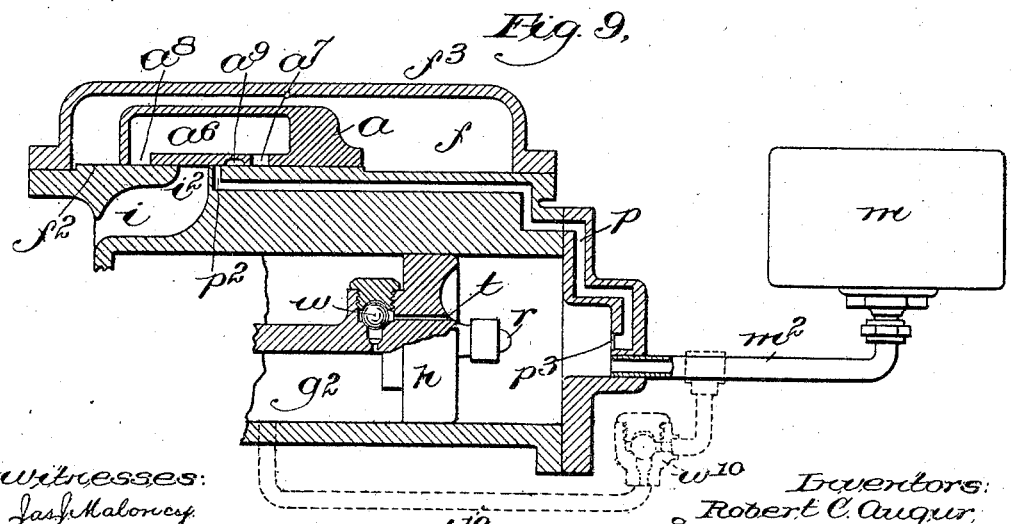

No. 725,020. PATENTED APR. 14, 1903.
R. C. AUGUR & H. F. BICKEL.
ENGINEER'S BRAKE VALVE.
APPLICATION FILED MAR. 31, 1902. RENEWED JAN. 5, 1903.
NO MODEL. 3 SHEETS—SHEET 3.
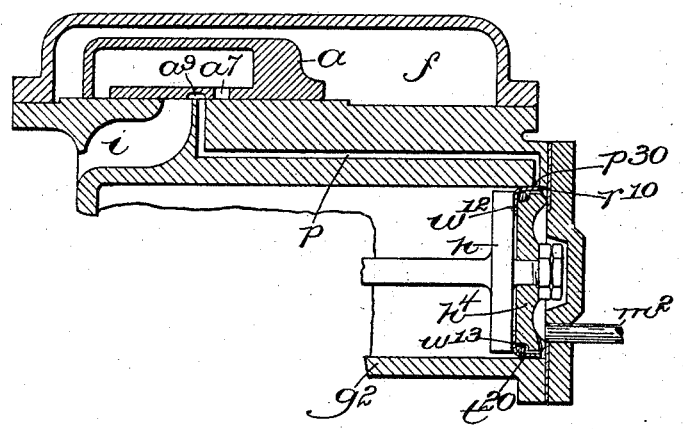
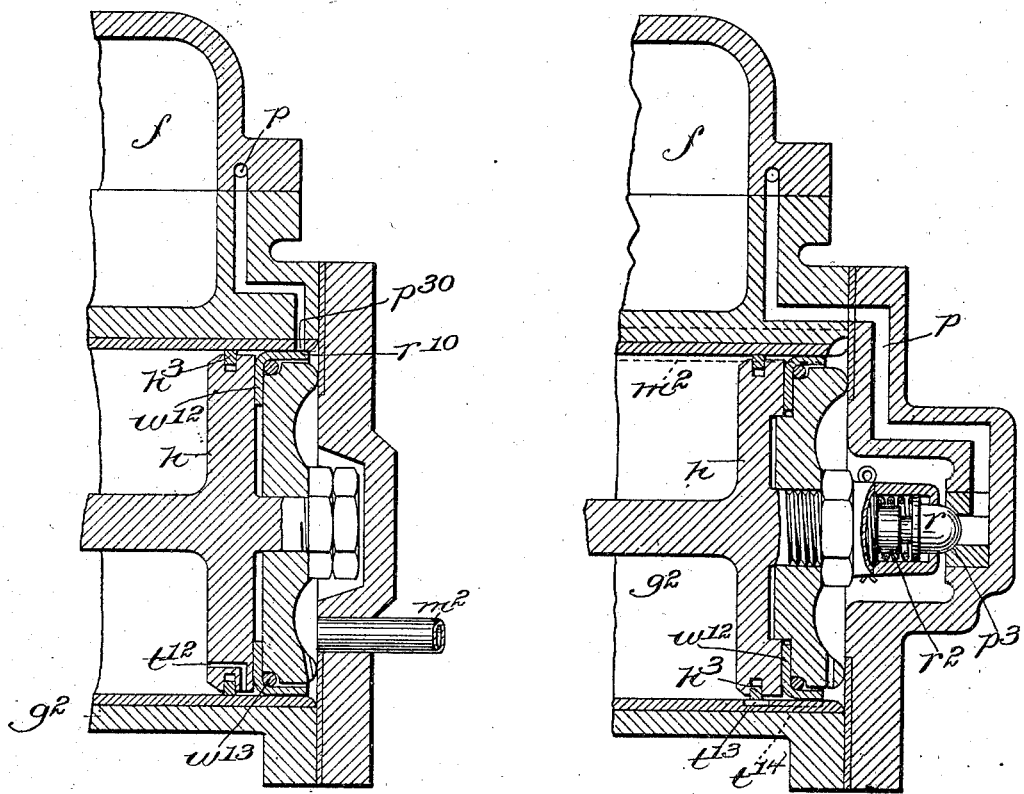

UNITED STATES PATENT OFFICE.

ROBERT C. AUGUR, OF WATERTOWN, NEW YORK, AND HENRY F. BICKEL, OF PLAINFIELD, NEW JERSEY, ASSIGNORS TO NEW YORK AIR BRAKE COMPANY, OF NEW YORK, N. Y., A CORPORATION OF NEW JERSEY.

ENGINEER'S BRAKE-VALVE.

SPECIFICATION forming part of Letters Patent No. 725,020, dated April 14, 1903.

Application filed March 31, 1902. Renewed January 5, 1903. Serial No. 137,947. (No model.)

*To all whom it may concern:*

Be it known that we, ROBERT C. AUGUR, of Watertown, county of Jefferson, and State of New York, and HENRY F. BICKEL, of Plainfield, county of Union, and State of New Jersey, have invented an Improvement in Engineers' Brake-Valves, of which the following description, in connection with the accompanying drawings, is a specification, like letters on the drawings representing like parts.

The present invention relates to an engineer's brake-valve, and is intended as an improvement on the type of brake-valve forming the subject of Letters Patent to Vaughan and McKee, No. 504,290, dated August 29, 1893.

The valve of the Vaughan and McKee patent has proved satisfactory in practical use; but there are certain conditions which sometimes may cause the valve to fail to give the proper automatic operation in shutting off the escape of air from the train-pipe in applying the brakes or may cause the automatic shutting off to take place at a somewhat-different pressure from that which would be produced in the normal or intended operation of the apparatus; and the present invention mainly consists in novel features of construction and arrangement whereby such abnormal operation of the apparatus is rendered impossible.

The engineer's valve of the Vaughan and McKee patent, in which the present invention is embodied, is characterized by a cut-off valve for closing the escape-passage through which the train-pipe air is permitted to escape in the operation of applying the brakes, which cut-off valve is operated by a piston subjected to train-pipe pressure upon one side and upon the other side to the pressure of a determinate quantity of air which normally is under a pressure equal to that in the train-pipe and which when the train-pipe pressure is reduced causes the cut-off piston to be moved a distance substantially proportional to the reduction in train-pipe pressure. This is because the reduction in train-pipe pressure caused by permitting the air to escape from the train-pipe leaves the determinate quantity of air which is confined in a small chamber or reservoir with a preponderating pressure, which causes the piston to move, and in such movement of the piston the determinate quantity of air following it expands, and thus diminishes in pressure in proportion to the movement of the piston, which movement will thus increase in extent as the train-pipe pressure falls by the escape of air from the train-pipe and as the pressure of the confined body of air falls on account of the expansion involved in following up the movement of the piston.

In the valve of the Vaughan and McKee patent the small chamber is opened to the atmosphere and the contained air is substantially wholly discharged in the operation of releasing the brakes, which is done by admitting air from the main reservoir into the train-pipe, and in this releasing operation the train-pipe pressure thus acts substantially unopposed upon the cut-off-actuating piston and moves it back to normal position—that is, to the starting-point of its movement—for automatically closing the escape-passage from the train-pipe in the next application of the brakes. Then in order again to provide a body of air in the small chamber under pressure equal to train-pipe pressure for the purpose of actuating the piston in the next application of the brakes the valve apparatus is provided with an equalizing-passage connecting the spaces at the two sides of the piston and controlled by the main hand-operated valve in such manner that said equalizing-passage is opened and affords a connection between the train-pipe and the small chamber only when the main valve is in running position—that is, when the train-pipe is in communication with the main reservoir through an excess-pressure or feed valve. This equalizing-passage of course has to be closed during an application of the brakes in order that the air may be entrapped in the small chamber to actuate the piston in accordance with the reduction of train-pipe pressure, said equalizing-passage being closed by the main hand-operated valve when the latter is moved by the engineer to the position for opening the escape-passage from the train-pipe, and thus causing the brakes to be applied.

The above-described means for effecting the return movement of the piston to normal position and for recharging the small chamber and maintaining the pressure therein equal to that in the train-pipe while the valve is in running position are such that under certain conditions or by certain possible manipulation the automatic operation of the cut-off valve may be prevented or may be caused to take place at a pressure in the train-pipe other than what would be produced in the regular or normal automatic operation of the cut-off valve; and the present invention consists mainly in novel means for diminishing the pressure in the small chamber to permit the piston to be restored to normal position and for recharging the small chamber when the piston is in normal position in order to provide the body of air requisite for the proper actuation of the piston in the next application of the brakes. The appliances employed for this purpose in accordance with the present invention are characterized by the absence of any equalizing connection around the piston and by not having the recharging-passage for the small chamber controlled in any way by the main hand-operated valve, the result being that, except in the operation of applying the brakes, the train-pipe air is always maintained with a pressure preponderating over that in the small chamber, and thus insures the return of the piston to and its retention in its normal position up to the time when the valve is operated to produce the next application of the brakes.

Figure 1 is a side elevation of an engineer's brake-valve embodying this invention. Fig. 2 is a longitudinal section thereof on line $x^2$ of Fig. 3; Fig. 3, a transverse section thereof on line $x^3$, Fig. 2. Fig. 4 is a plan of the face of the main hand-operated valve. Fig. 5 is a transverse section on line $x^5$, Figs. 1 and 6. Fig. 6 is a plan of the valve-seat. Fig. 7 is a sectional plan of the valve on line $x^7$, Fig. 2; Fig. 8, a longitudinal section showing the operative relation of some of the parts when in running position, and Fig. 9 is a similar view showing the relation of said parts in a service application of the brakes. Figs. 8 and 9 do not show the exact structural form of the ports or passages, but are in the nature of diagrams to show the operative relations more simply than if the actual construction were represented. Figs. 10, 11, and 12 illustrate modifications in construction which may be employed in carrying out the invention.

For an understanding of the present invention it will be necessary to describe the mode of operation of the main parts of the valve, which do not in themselves constitute the present invention, and are shown as substantially the same as in the Vaughan and McKee patent before referred to.

As is well known, the operation of the familiar automatic air-brake apparatus involves the charging of the train-pipe with air to release the brakes and the maintenance of a substantially constant pressure, usually seventy pounds to the square inch, in the train-pipe while the train is running with the brakes released. To make a graduated or service application of the brakes, air is permitted to escape from the train-pipe, so as to reduce the pressure therein, and the brakes are applied with increasing force as the train-pipe pressure diminishes until the maximum braking-force is attained, which requires a reduction in train-pipe pressure to fifty pounds or somewhat less. To apply the brakes promptly, the train-pipe pressure is reduced quickly by opening a large vent from the train-pipe, which causes the brakes to be applied with maximum braking force almost instantly. This is called an "emergency" application of the brakes.

The engineer's brake-valve is an apparatus for enabling the engineer to govern the admission of air to and its discharge from the train-pipe to cause all the desired operations of the brakes to take place, and the brake-valve in which the present invention is embodied contains a hand-operated valve $a$, adapted to be manipulated by the engineer by means of a handle $b$, which valve when at the extreme left-hand position with relation to a person facing the valve, as seen in Figs. 1 and 2, opens a large passage between the main air-reservoir on the locomotive and the train-pipe, and thus charges the train-pipe to release the brakes. The valve apparatus has passages $c$ $d$, adapted to be connected with the main reservoir on the locomotive and with the train-pipe, respectively. The pressure is usually maintained in the main reservoir considerably higher than that normally required in the train-pipe when fully charged, and after the brakes are released the valve $a$ is placed in running position, in which it affords a connection from the main reservoir to the train-pipe through a reducing-valve or pressure-retaining valve $e$. (See Figs. 5 and 6.) The running position of the valve $a$ is a short distance to the right of the release position, and in connection with the engineer's handle $b$ there is a notched segment $b^2$ to facilitate the placing of the handle and valve in the various positions required in the operation of the brakes.

For graduated or service applications of the brakes the valve $a$ is moved by the handle $b$ to the right from the running position a greater or less amount, according to the degree of braking force desired, this movement of the valve cutting off the connection between the main reservoir and the train-pipe and establishing a connection from the train-pipe to the atmosphere through which air may escape from the train-pipe to reduce the train-pipe pressure and cause the brakes to be applied with a force depending upon the amount of train-pipe-pressure reduction.

For emergency application of the brakes the valve $a$ is thrown by the handle $b$ to the extreme right-hand position, and thus opens a large escape-passage from the train-pipe to the atmosphere, thus giving a sudden reduction of the train-pipe pressure, which causes the brakes to be promptly applied with full force. The ports and passages by which these effects are produced are as follows: The main-reservoir connection $c$ communicates by the passage $c^2$ (see Fig. 5, shown also in dotted lines, Fig. 1) with the space in the valve-chest $f$, so that the full main-reservoir pressure is at all times maintained in the valve-chest and upon the outside of the valve $a$. The valve-seat $f^2$, upon which the valve $a$ works, is provided with a port or opening $g$, communicating with the space in the main body of the valve apparatus, which is in constant communication with the train-pipe through the passage $d$. A portion of the said space in the body of the valve is made as a cylinder $g^2$, in which works the piston $h$, which operates to cut off or stop the escape of air from the train-pipe automatically in the service application of the brakes, as will be explained. The said piston $h$ is thus constantly subjected to train-pipe pressure on its left-hand side, tending to move it to the right-hand end of the cylinder $g^2$.

In order to release the brakes, the movement of the valve $a$ to the extreme left-hand position uncovers the right-hand portion of the opening $g$, and thus admits the air directly from the valve-chest $f$ and main reservoir into the body of the valve and train-pipe to recharge the latter and release the brakes.

In the running position the connection is made from the train-pipe to the main reservoir through the excess-pressure or feed valve $e$. The said excess-pressure valve $e$ is contained in a passage $e^2$, leading from the valve-chest $f$, and the air after passing the said valve $e$ enters a passage $e^3$, having ports $e^4$ leading to the valve-seat $f^2$. The valve $a$ has near its right-hand end pockets or cavities $a^2$, which in the running position of the valve, as shown in Fig. 2, connect the ports $e^4$ with the opening $g$, so that in this position air may pass to the train-pipe as may be required to make up for leakage and to retain the normal pressure in the train-pipe, said air passing from the main reservoir and valve-chest $f$ through the passage $e^2$, past the valve $e$, and thence through the passages $e^3$ $e^4$ and cavities $a^2$ in the valve into the opening $g$, and thence through the body of the valve into the train-pipe connection $d$.

A slight movement of the valve $a$ to the right from the running position (shown in Fig. 2) will carry the pockets $a^2$ off from the opening $g$ in the valve-seat, and thus close the connection last described from the main reservoir through the valve $e$ to the train-pipe, and in this position all of the passages with one exception, which will be described later on, are closed or blanked, this position being known as the "lap" position of the valve, which, however, takes no part in the regular operation of the brake apparatus. In all further movement of the valve $a$ to the right throughout its entire range of movement the communication from the main reservoir, either direct or through the valve $e$, to the train-pipe is cut off. Such further movement of the valve to the right causes the brakes to be applied by permitting air to escape from the train-pipe, as follows: The valve apparatus is provided with a main exhaust-passage $i$, leading to the atmosphere and having a port-opening $i^2$ in the valve-seat $f^2$ under the valve $a$. When the handle $b$ is moved to the right to one of the service-application notches, communication is established between the opening $g$ from the body communicating with the train-pipe to the exhaust-passage $i$ by a passage $a^3$ in the valve $a$, having port-openings $a^4$ $a^5$ in the face of the valve that travels on the valve-seat. The opening $a^5$ comes into connection with the exhaust-port $i$, and the opening $a^4$ passes the right-hand edge of the movable cut-off slide $k$, so that the air is permitted to escape from the train-pipe through the exhaust-passage $i$.

The escape of air from the train-pipe is automatically stopped by the cut-off slide $k$ when the train-pipe pressure is reduced to the desired amount, depending upon the distance the engineer moves the handle $b$ toward the right in the range of service positions. This automatic movement of the cut-off slide $k$ is produced by the piston $h$, the rod or stem $h^2$ of which is connected with the slide $k$ by the lever $k^2$, pivoted at $k^3$, the connection being such that a movement of the piston $h$ toward the left produces a much smaller movement of the slide $k$ toward the right.

The space in the end of the cylinder $g^2$ at the right-hand side of the piston $h$ is in constant communication through the passage $m^2$ with a small reservoir or chamber $m$, (see Figs. 1, 8, and 9,) said chamber being of a capacity proportional to the capacity of the cylinder $g^2$, so that a quantity of air in said chamber at a given pressure—for example, approximately the normal train-pipe pressure—will fall in pressure by expansion in the desired rate as the piston $h$ moves toward the left, and thus affords space in the cylinder at the right hand of the piston for the air in the small reservoir $m$ to expand into.

Assuming that air is contained in the chamber $m$ at train-pipe pressure just before the movement of the valve $a$ to produce a service application of the brakes, as has been described, it will be seen that when the port $a^4$ of the valve has been moved beyond the right-hand edge of the slide $k$ air will escape from the train-pipe and the train-pipe pressure will gradually fall as the air continues to escape. This will reduce the pressure upon the left-hand side of the piston $h$, thus leaving the pressure in the small reservoir on the right-hand side in preponderance and causing the piston $h$ to move toward the left. In this movement the pressure on the right will fall by expansion of the air, and therefore the movement will continue only as the train-pipe pressure continues to fall, and the extent of the movement will depend upon the amount of fall of train-pipe pressure. Assuming that the port $a^4$ was moved only a slight distance beyond the right-hand edge of the slide $k$, a comparatively small movement of the piston $h$ toward the left, such as would result from a comparatively small reduction in train-pipe pressure, would move the slide $k$ far enough to the right to close the port $a^4$, so that the further escape of air from the train-pipe would be automatically stopped; but if the valve $a$ had been moved farther toward the right a longer movement of the piston and of the slide $k$ would be required before the port would be closed, and consequently a greater reduction in train-pipe pressure would be effected before the automatic stopping of the escape of air from the train-pipe, and thus the different pressures that may be desired are attained by moving the handle $b$ different distances in the range of service-application positions.

The movement of the valve $a$ promptly to extreme right-hand position affords a large connection from the opening $g$ to the exhaust-port $i$ through the passage $a^6$ in the valve, which is independent from the passage $a^3$ and has port-openings $a^7$ $a^8$, which are brought, respectively, over the openings $g$ and $i^2$ when the valve arrives at extreme right-hand position, and thus afford a large vent from the train-pipe, as is required for producing an emergency application of the brakes.

The parts thus far described may be of the same construction as adopted in apparatus of this general type heretofore, and are shown as substantially the same as in the valve made under the Vaughan and McKee patent for actual service.

The present invention consists in the combination, with the parts thus far described, of appliances for further controlling the operation of the cut-off piston $h$, including the means for charging the chamber $m$ with air under proper pressure to insure the automatic operation of the piston $h$, as before described. In order that the piston $h$ may operate properly to cut off the discharge of air from the train-pipe automatically, as has been described, it is necessary that the said piston should be at the proper starting-point—namely, at the extreme right-hand end of the cylinder $g^2$—when the engineer operates the valve $a$ to effect a service application of the brakes. It is necessary, therefore, after each application of the brakes that the piston $h$ should be moved back to the right-hand end of the cylinder $g^2$, which is its normal position. In order to insure that this return movement of the piston shall take place promptly and fully, means are provided for reducing the pressure in the chamber $m$ in the operation of releasing the brakes. For this purpose a passage $p$ is formed leading from the space at the right-hand side of the cylinder $g^2$ to the seat $f^2$ of the main valve $a$, and said passage has a port-opening $p^2$ in said seat $f^2$ adjacent to the exhaust-port opening $i^2$. For convenience in construction the said passage is made in part in the bonnet or cover $f^3$ of the valve-chest $f$, but for convenience in illustration it is shown as passing more directly to the valve-seat in Figs. 8 and 9 and in somewhat different location with reference to the exhaust-port opening $i^2$. When the valve $a$ is moved to release position, one of the port-openings $a^7$ comes over the port-openings $p^2$ and $i^2$, and thus connects the passage $p$ from the end of the cylinder connected with the chamber $m$ with the exhaust-passage $i$, so that air escapes from the small chamber $m$ and reduces the pressure below that in the train-pipe acting upon the left-hand side of the piston $h$, so that said piston $h$ is promptly moved back to the right-hand end of the cylinder. The escape of air from the small chamber $m$, which is afforded, as has just been described, to insure the prompt return of the piston $h$, is arrested by the said piston $h$ as soon as it arrives at normal position, said piston being provided with a valve $r$, constructed like a check-valve and pressed outward from the piston by a spring $r^2$, so that said valve $r$ seats in a seat $p^3$, provided for it at the end of the passage $p$, and thus closes said passage just before the piston $h$ arrives at its normal position and retains the said passage closed as long as the piston remains in normal position either against or very close to the right-hand end or bonnet of the cylinder $g^2$. By these means the pressure in the small chamber $m$ has been reduced to an amount slightly below that in the train-pipe at the time when the engineer operated the valve $a$ to release the brakes, and during or after the operation of releasing the brakes the pressure will rise on the left-hand or train-pipe side of the piston $h$ to the pressure normally carried in the train-pipe, and it is necessary that the pressure in the chamber $m$ should be increased to an amount approximately equal to that of the train-pipe in order that the compressed air in the chamber $m$ may actuate the piston $h$ properly in the next service application of the brakes. This recharging of the chamber $m$ is effected by a passage $t$ through the piston $h$, controlled by a check-valve $w$, which permits the air to flow through the passage $t$ from the train-pipe side of the piston into the small chamber $m$, but which prevents any return flow through said passage from the chamber $m$ into the train-pipe. The small chamber $m$ will thus be charged from the train-pipe through the passage $t$ in the piston to a pressure approximately equal to that in the train-pipe. In the movement of the main valve $a$ to effect an application of the brakes the said main valve covers the port-opening $p^2$, and thus completely entraps the air in the small chamber $m$, so that it may act by its expansive pressure to operate the piston $h$ and control the cut-off slide $k$ automatically, as before explained.

When the main valve $a$ is in running position, connecting the train-pipe with the main reservoir through the excess-pressure valve $e$, as before explained, there may possibly be some fluctuations in train-pipe pressure, which take place so slowly that they do not affect the brakes, and it is therefore possible that the train-pipe pressure may be reduced a little after the pressure in the small chamber $m$ has been made approximately equal thereto, and as there is no equalizing connection between the spaces at the two sides of the piston $h$ the pressure in the chamber $m$ would be in excess of train-pipe pressure and would move the piston $h$ away from its normal position, in which advanced position it might remain, and thus interfere with the proper automatic cut-off action at the next application of the brakes. In order to avoid such operation and always to keep the piston $h$ in substantially its normal position, except when it is intended to move forward in applying the brakes, the main valve $a$ is provided with a pocket or cavity $a^9$, so located as to overlie the openings $p^2$ and $i^2$, and thus connect the passage $p$ from the small chamber $m$ with the exhaust-passage $i$ when the valve $a$ is in running position, and preferably, also, when it is in lap position, but not when in service or emergency positions.

The pocket $a^9$ for connecting the passages $p$ and $i$ when the valve is in running position is made as a cavity in the face of the valve and does not communicate with the passage $a^6$ in the valve, because when the valve is in running position the openings $a^7$ are over the opening $g$ in the valve-seat, thus admitting train-pipe air into the passage $a^6$, which must, of course, at this time be cut off from communication with the exhaust-passage $i$.

Escape of air through the passage $p$ from the small chamber $m$ is controlled entirely by the valve $r$ in the cut-off-actuating piston $h$, and the mode of operation is as follows: If for any cause other than the discharge of air by the engineer's valve to effect the application of the brakes (involving the movement of valve $a$ to service or emergency position) the train-pipe pressure should fall below the pressure in the small reservoir $m$ sufficiently to produce a movement of the piston $h$ toward the train-pipe side, the said movement would unseat the valve $r$ from the opening $p^3$ of the passage $p$ and permit air to escape from the small chamber $m$ through the said passage $p$ to the exhaust $i$ and to the atmosphere. This escape of air will continue only until the pressure in the small chamber $m$ is enough below the train-pipe pressure to enable the latter to move the piston $h$ back to its normal position, in which movement the passage $p$ will again be closed by the valve $r$, and further escape of air from the small chamber will be prevented. By this construction the passage $t$ for charging the small chamber $m$ is wholly independent of the main hand-operated valve $a$, and air is admitted into the small chamber when and only when the pressure on the train-pipe side of the piston $h$ is greater than that in the small chamber, and this construction has advantages over the construction previously employed in valves of this type in which there was an equalizing-passage connecting the spaces at the two sides of the piston $h$ and controlled by the hand-operated valve $a$. Where such equalizing-passage is employed, the equalization of pressures may exist without regard to the position of the piston $h$, and said piston being normally subjected to equal pressures on the two sides may possibly be moved by the jars and forces incident to its use on a locomotive from the normal position at the end of the cylinder $g^2$, and in case it should be so moved it would not operate properly to close the cut-off $k$ at the train-pipe pressure desired and expected by the engineer. It is possible not only that the piston may be moved from its normal position while the equality of pressures on its two sides is maintained, but that by the movement of the main valve $a$ after an application of the brakes to running position, either directly or very quickly after its movement to release position, the equalization may be effected before the piston $h$ has been moved to its normal position, and in such event of course there would be nothing to move the piston to the normal position. By the construction forming the subject of the present invention, on the other hand, in which there is no equalizing connection through or around the piston and in which the flow of air to and from the small chamber $m$ is not controlled by the main hand-operated valve $a$ or any of the working parts of the valve mechanism there is always insured a sufficient preponderance of pressure upon the train-pipe side when the valve is in running position to retain the piston $h$ in its normal position with certainty, and the small chamber $m$ is never wholly depleted of air and is always promptly recharged to a pressure approximately equal to train-pipe pressure, so as to be in readiness to actuate the piston $h$ whenever a service application of the brakes is made.

It is to be observed that the recharging-passage $t$ is merely a connection between the air-spaces at the two sides of the piston $h$, which is controlled by a check-valve or equivalent device or construction which will permit the air to flow in one direction only through said connection, which flow of air is wholly independent of the movements of the main valve $a$ and may be wholly independent of the movements of all of the working or moving parts of the valve apparatus, although in some constructions it may depend in part upon the position of the piston. Consequently it is not necessary that said recharging-passage should be formed through the piston itself; but it may be any pipe, duct, passage, or space connecting the train-pipe or train-pipe space in the apparatus at any point with the small chamber $m$ or any part of the air-space at the right-hand side of the piston $h$. Such recharging-passage might, for example, be made, as shown in dotted lines, Fig. 9, as a pipe $t^{10}$, leading to the air-space communicating with the small chamber $m$ from the train-pipe or the train-pipe space in the valve-body and containing a check-valve $w^{10}$, which prevents flow of air toward the train-pipe, but permits air to flow from the train-pipe whenever its pressure exceeds the back pressure on the check-valve sufficiently to open the latter. Other constructions involving the same method of recharging the small chamber $m$ and of controlling the escape of air therefrom by the piston $h$ are illustrated in Figs. 10, 11, and 12.

For the purpose of recharging the chamber $m$ it is not essential that a duct or passage should be formed through the piston or in the wall of the chamber. The construction of the piston and its packing may be such, as is illustrated in Fig. 10, for example, as to afford a sufficient passage or space, as indicated at $t^{20}$, between the periphery of the piston and the inner surface of the cylinder to afford connection between the air-spaces at the two sides of the piston through which the air may pass with sufficient rapidity to recharge the small chamber as promptly as need be, and the packing of the piston may itself serve as or constitute a check-valve which permits the air to pass through such connecting-passage between the piston and cylinder in one direction only—namely, from the train-pipe to the small chamber—while precluding the passage of air in the reverse direction.

In the construction shown the piston is provided with a cup-leather or flexible packing-ring $w^{12}$, having a plane portion clamped tightly between the main portion $h$ of the piston and a follower $h^4$, the said leather packing-ring having a cylindrical portion extending from the plane portion over the periphery of the follower $h^4$ toward the side of the piston which is subjected to the pressure of the air in the small chamber $m$. The cylindrical portion of the said leather packing-ring $w^{12}$ is normally pressed outward against the walls of the cylinder by the spring-wire $w^{13}$. With this construction the pressure of air upon the train-pipe side will tend to separate the cylindrical portion of the packing-ring from contact with the inner surface of the cylinder, and thus when said pressure is in excess of the pressure on the other side of the piston it will crowd the cylindrical portion of the packing-ring inward, and thus open a sufficient space between the packing-ring and surface of the cylinder for the passage of air to recharge the small chamber. The pressure of air on the other side of the piston, toward which the cylindrical or tubular portion of the packing-ring projects, will, however, tend to expand the said tubular packing portion and to press it into tight contact with the inner surface of the cylinder, so that it will close the connecting space or passage tightly against the passage of air from the side of the piston subjected to the pressure of air in the small chamber toward the side subjected to train-pipe pressure. Thus a slightly-loose fit of the piston when provided with a flexible or cup-leather packing arranged as shown will afford a connecting-passage between the air-bodies at the two sides of the piston, and the packing will constitute a check-valve, so as to permit flow of air through said passage only in the direction from the train-pipe side toward the small reservoir. Where the piston is also provided with a metallic packing-ring, as indicated at $h^3$, Fig. 11, the said ring may be provided with a sufficient space between its adjoining or overlapping ends for the passage of air past the periphery of the piston, or the said piston may be provided with a passage, as shown at $t^{12}$, Fig. 11, from the train-pipe side to the periphery of the piston between the metallic packing-ring $h^3$ and the flexible or cup-leather packing-ring $w^{12}$. Another way of providing a passage of this character is shown in Fig. 12, in which the wall of the cylinder is provided with a short passage $t^{13}$, which when the piston is in normal position at or near the right-hand end of the cylinder extends from the train-pipe side of the piston to a point over the periphery of the piston between the metallic and flexible packing-rings $h^3$ and $w^{12}$. This passage may be merely a groove in the wall of the cylinder, and it is obvious that the said groove might be extended, as indicated in dotted lines at $t^{14}$, to or even beyond the edge of the cup-leather packing-ring $w^{12}$. If thus extended, there might be a return or back flow of air from the small chamber toward the train-pipe when the piston is in extreme right-hand position; but if the train-pipe pressure is reduced as rapidly as is required for making an application of the brakes the excess of pressure in the small chamber $m$ will move the piston from the right-hand end of the cylinder almost immediately, so that the piston will pass the left-hand end of the passage $t^{14}$, and thus prevent such back flow of air, so that with this construction the piston itself would constitute substantially a check-valve with reference to the recharging-passage $t^{14}$. Furthermore, in the construction illustrated in Fig. 12 if the spring $r^2$ of the valve $r$ is of sufficient force to just overcome the frictional resistance to movement of the piston when the air-pressures upon its opposite sides are equal the back flow of the air through the passage $t^{14}$ will be wholly prevented, the operation then being as follows: When the train-pipe pressure is in excess, it will compress the spring $r^2$, as shown in Fig. 12, thus completely uncovering the left-hand end of the recharging-passage $t^{14}$; but as soon as the pressure in the small chamber $m$ becomes almost equal to that in the train-pipe the reaction of the spring $r^2$ will carry the piston back far enough toward the left to completely cover the left-hand end of the recharging-passage $t^{14}$, and thus close the said passage, the piston thus operating as a check-valve in connection with said passage to permit the flow of air through the said passage only in the direction from the train-pipe to the small chamber $m$. The term "check-valve" is therefore to be understood as including any construction or contrivance for permitting the flow of air in one direction while preventing flow in the opposite direction. The leather packing-ring may also constitute the valve which is operated by the piston for controlling the escape of air from the small chamber to cause the piston to return to its normal position, as before explained. In other words, the said cup-leather packing-ring may be employed as an equivalent for the valve $r$. (Shown in Figs. 2, 8, 9, and 12.) Such construction is illustrated in Figs. 10 and 11, in which the opening $p^{30}$ of the passage $p$ is formed in the inner surface of the cylinder in such position as to be covered and closed by the cylindrical portion of the leather packing-ring, as shown at $r^{10}$, when the piston is in or near its normal position. The said cup-leather thus constitutes a valve by which the piston controls the air-escape passage $p$, said passage being opened if for any reason the piston is away from the normal position, (except in the operation of making an application of the brakes by the engineer's valve when said passage is closed or blanked by the main valve $a$,) and thus permitting the air to escape from the small chamber $m$ until the preponderance of train-pipe pressure on the other side of the piston forces it back to normal position, and thereby causes the portion $r^{10}$ of the cup-leather to close the escape-port $p$, after which the small chamber $m$ will be recharged to approximately train-pipe pressure through the charging-passage, which may be either the space between the periphery of the piston and its packing and the inner surface of the cylinder, as illustrated in Figs. 10, 11, and 12, or may be any suitable passage through or around the piston, as illustrated in Fig. 9, controlled by a check-valve or equivalent, which permits the air to pass from the train-pipe to charge the small reservoir, but prevents the return of air from the small reservoir to the train-pipe side of the piston.

Obviously the specific construction of the recharging-passage does not in general depend upon the specific construction adapted for the valve for controlling the escape-passage from the small chamber $m$.

The operation of the apparatus is as follows: At the end of a service application the piston $h$ will be in the position shown in Fig. 9 at a distance from its normal position at the right-hand end of the cylinder $g^2$, dependent upon the degree of braking force that has been employed in applying the brakes, and the pressure of the air upon both sides of the piston $h$ will be below the normal train-pipe pressure by an amount also dependent upon the degree of braking force that has been obtained, the pressure in the supplemental reservoir at the right of the piston being, however, in excess of the train-pipe pressure by about the amount required to overcome the resistance to the movement of the piston $h$ and connected parts. Then for releasing the brakes the valve is usually moved clear over to the extreme left-hand position, so that the port-opening $a^7$ connects the passages $p$ and $i$, or in some cases it may be moved merely to running position, in which the cavity $a^9$ connects the passages $p$ and $i$, as shown in Fig. 8. In either case—that is, whether the valve is carried to what is known as "full-release" position to connect the main reservoir directly with the train-pipe or is carried to running position in which the main reservoir is connected with the train-pipe only through the excess-pressure valve $e$—the brakes will be released by the charging of the train-pipe, and at the same time the passage $p$ will be connected with the atmosphere, permitting the air to escape from the supplemental reservoir and cylinder $g^2$ at the right-hand side of the piston $h$ until the pressure therein falls enough below train-pipe pressure to have the preponderance of the latter move the piston to the right, which movement will take place very rapidly, and thus cause the valve $r$ to stop the escape of air from the small reservoir and further reduction in pressure therein as soon as said pressure has fallen only slightly below the pressure then existing in the train-pipe. During this operation the check-valve $w$ (or $w^{10}$, Fig. 9) will of course be open and the train-pipe air permitted to pass through the passage $t$ (or $t^{10}$) to the right-hand side of the piston, which is open to the atmosphere during the short interval of time required for the piston to travel back to its normal position. The passage $t$ is, however, so small that such passage of air through it does not appreciably reduce the train-pipe pressure, substantially the full effect of which is exerted at the left-hand side of the piston, and consequently produces the prompt movement of the piston as soon as the pressure on the right-hand side falls slightly below the train-pipe pressure. The capacity of the small chamber $m$ is so small, however, that said chamber will be very quickly recharged through the passage $t$ to approximately train-pipe pressure, so that the engineer's valve will be ready for a prompt reapplication of the brakes, if desired, immediately after the brakes have been released either by moving the handle to what is known as "full-release"

position or by moving it to running position to perform what is sometimes known as the "slow release" of the brakes. With the construction heretofore commonly adopted for this type of engineer's valve, on the other hand, if the brakes were released by moving the valve to running position the equalizing-passage connecting the spaces at the two sides of the piston $h$ would be opened and unobstructed and the pressure would be equalized upon the two sides of said piston while in the abnormal position in which it was left at the end of the operation of applying the brakes, being the position corresponding to that shown in Fig. 9 of the drawings in the present case. Such manipulation of the valve is improper in the case of said prior construction and may cause trouble on the next application of the brakes, because the cut-off slide $k$ would be in improper or abnormal position, and consequently the engineer would not open the vent from the train-pipe or it would not be retained open until the desired pressure had been obtained, such as would be obtained by moving the handle to the same position if the apparatus had been properly manipulated on the previous release of the brakes. With the present construction, however, the valve will operate equally satisfactorily whether the brakes are released by moving the valve to full-release position or by moving it to running position to effect the slow release of the brakes, and consequently for this apparatus either mode of manipulating the valve is proper so far as the action of the apparatus is concerned and the trouble or inconvenience which might arise from improper manipulation of the old form of valve is wholly eliminated.

While the foregoing description has been directed specifically to the construction of the engineer's valve herein shown and described, it is obvious that the invention is not limited to the specific details of construction or arrangement, but is applicable to any engineer's valve having an automatic cut-off operated by a piston or equivalent device subjected to train-pipe pressure on one side and to a coöperating air-pressure of the nature hereinbefore described on the other side.

We claim—

1. In an engineer's brake-valve, the combination of the main valve adapted to effect the admission of air to and the escape of air from the train-pipe; and an automatic cut-off valve for stopping the escape of air from the train-pipe, and an actuating-piston for said cut-off valve subjected to train-pipe pressure on one side, and to the pressure of a confined body of air upon the other side; with a discharge-passage for the escape of said confined air, and a valve controlling the same operated by the piston; and a passage connecting the air-bodies at the two sides of the piston and provided with a check-valve which permits the flow of air from the train-pipe side only, substantially as and for the purpose described.

2. In an engineer's brake-valve, the combination of the main valve adapted to effect the admission of air to and the escape of air from the train-pipe; and an automatic cut-off valve for stopping the escape of air from the train-pipe, and an actuating-piston for said cut-off valve subjected to train-pipe pressure on one side, and to the pressure of a confined body of air upon the other side; with a discharge-passage for the escape of said confined air, and a valve controlling the same operated by the piston; and means for closing said passage when an application of the brakes is being made; and a passage connecting the air-bodies at the two sides of the piston and provided with a check-valve which permits the flow of air from the train-pipe side only, substantially as described.

3. In an engineer's brake-valve, the combination of the main valve adapted to effect the admission of air to and the escape of air from the train-pipe; and an automatic cut-off valve for stopping the escape of air from the train-pipe, and an actuating-piston for said cut-off valve subjected to train-pipe pressure on one side, and a chamber containing a confined body of air acting upon the other side of said piston; with a discharge-passage from said chamber and a valve controlling the same controlled by the piston, said main valve having provision for opening and closing said discharge-passage, when said main valve is in the position for admitting air to, and for discharging air from the train-pipe respectively, and means for charging said chamber after air has been permitted to escape therefrom, substantially as described.

In testimony whereof we have signed our names to this specification, in the presence of two subscribing witnesses, on the 14th day of March, 1902.

ROBERT C. AUGUR.
HENRY F. BICKEL.

Witnesses as to Robert C. Augur:
JNO. F. MALONEY,
H. G. WORKMAN.

Witnesses as to Henry F. Bickel:
C. H. CHAFFEE,
G. C. HICKINGBOTHAM.